(12) United States Patent
Frenne et al.

(10) Patent No.: US 10,506,570 B2
(45) Date of Patent: Dec. 10, 2019

(54) EPDCCH SEARCH SPACE DESIGN

(71) Applicant: Telefonaktiebolaget L M Ericsson (publ), Stockholm (SE)

(72) Inventors: Mattias Frenne, Uppsala (SE); Johan Furuskog, Stockholm (SE); Havish Koorapaty, Saratoga, CA (US); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 13/989,833

(22) PCT Filed: Jan. 17, 2013

(86) PCT No.: PCT/SE2013/050027
§ 371 (c)(1),
(2) Date: May 29, 2013

(87) PCT Pub. No.: WO2014/021754
PCT Pub. Date: Feb. 6, 2014

(65) Prior Publication Data
US 2014/0078980 A1 Mar. 20, 2014

Related U.S. Application Data

(60) Provisional application No. 61/679,140, filed on Aug. 3, 2012.

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0053* (2013.01)

(58) Field of Classification Search
CPC ..... H04L 5/0053; H04L 5/001; H04L 5/0094; H04L 5/0035; H04L 1/1861;
(Continued)

(56) References Cited

U.S. PATENT DOCUMENTS

2013/0039284 A1* 2/2013 Marinier et al. ............. 370/329
2013/0114530 A1* 5/2013 Chen et al. ................... 370/329
(Continued)

FOREIGN PATENT DOCUMENTS

CN 102263616 A 11/2011
CN 102404076 A 4/2012
(Continued)

OTHER PUBLICATIONS

US 9,226,273 B2, 12/2015, Papasakellariou (withdrawn)*
(Continued)

*Primary Examiner* — Marsha D Banks Harold
*Assistant Examiner* — Elton Williams
(74) *Attorney, Agent, or Firm* — Muprhy, Bilak & Homiller, PLLC

(57) ABSTRACT

Techniques for supporting both localized and frequency-distributed control channel messages in the same enhanced control channel region are disclosed. An example method begins with receiving (2010) a downlink signal comprising an enhanced control region consisting of at least two sets of physical resource block (PRB) pairs. The method continues with the forming (2020) of one or more distributed enhanced control-channel elements (eCCEs) from a first set of PRB pairs by aggregating physical layer building blocks from multiple PRB pairs to form each distributed eCCE. One or more localized eCCEs are formed (2030) from a second set of PRB pairs by aggregating physical layer building blocks such that each of the localized eCCEs is formed from physical layer building blocks from within a single PRB pair
(Continued)

of the second set. Control channel message candidates are formed (2050) from the distributed eCCEs and localized eCCEs, respectively, and decoded (2060).

15 Claims, 16 Drawing Sheets

(58) Field of Classification Search
CPC ...... H04L 1/0004; H04L 1/001; H04W 72/04; H04W 16/10; H04W 48/12; H04W 72/048
See application file for complete search history.

(56) References Cited

U.S. PATENT DOCUMENTS

| | | | | |
|---|---|---|---|---|
| 2013/0242885 | A1* | 9/2013 | Zhu et al. | 370/329 |
| 2013/0301542 | A1* | 11/2013 | Krishnamurthy et al. | 370/329 |

FOREIGN PATENT DOCUMENTS

| | | |
|---|---|---|
| JP | 2012005040 A | 1/2012 |
| JP | 2015531201 A | 10/2015 |
| WO | 2009104848 A1 | 8/2009 |
| WO | 2012045584 A1 | 4/2012 |

OTHER PUBLICATIONS

Unknown, Author. "Multiplexing of ePDCCHs and ePDCCH RE mapping." Panasonic. 3GPP TSG RAN WG1 Meeting #68bis. R1-121163. Jeju, Korea. Mar. 26-30, 2012. 1-5.

Unknown, Author. "ePDCCH search space design and configuration." Panasonic. 3GPP TSG RAN WG1 Meeting #69. R1-122202. Prague, Czech Republic. May 21-25, 2012.

Unknown, Author, "Definitions of eREG and eCCE", Panasonic, 3GPP TSG RAN WG1 Meeting #69, R1-122201, Prague, Czech Republic, May 21-25, 2012, 1-4.

Unknown, Author, "eCCE/eREG Definition for ePDCCH", Alcatel-Lucent Shanghai Bell, Alcatel-Lucent, 3GPP TSG RAN WG1 Meeting #69, R1-122497, Prague, Czech Republic, May 21-25, 2012, 1-2.

Unknown, Author, "ePDCCH search space design", NEC Group, 3GPP TSG RAN WG1 Meeting #69, R1-122595, Prague, Czech Republic, May 21-25, 2012, 1-10.

Unknown, Author, "Multiplexing of Localised and Distributed ePDCCH parts in same PRBs", LG Electronics, 3GPP TSG RAN WG1 Meeting #69, R1-122310, Prague, Czech Republic, May 21-25, 2012, 1-3.

Unknown, Author, "On the definition of eCCE/eREG", Intel Corporation, 3GPP TSG RAN WG1 Meeting #69, R1-122652, Prague, Czech Republic, May 21-25, 2012, 1-3.

Unknown, Author, "ePDCCH DMRS", 3GPP TSG RAN WG1 Meeting #68bis, R1-121353, Sharp, Jeju, Korea, Mar. 26-30, 2012, 1-4.

Unknown, Author, "Necessity of Multiplexing of Localized and Distributed ePDCCH Parts in the Same PRBs", 3GPP TSG-RAN WG1 #69, R1-122168, MediaTek Inc., Prague, Czech, May 21-25, 2012, 1-3.

Unknown, Author, "Search Space Aspects for ePDCCH", 3GPP TSG-RAN WG1 #70, R1-123616, Ericsson, Qingdao, China, Aug. 13-17, 2012, 1-5.

Unknown, Author, "Way Forward on ePDCCH Search Space", TSG-RAN WG1 Meeting #69, R1-122979, Prague, Czech, May 21-25, 2012, 1-4.

Unknown, Author , "Search Space Design for ePOCCH Transmission Schemes", 3GPP TSG RAN WG1 Meeting #69, R1-122899, Prague, Czech Republic, May 21-25, 2012, 1-8.

* cited by examiner

PRIOR ART

PRIOR ART

EPDCCH SEARCH SPACE DESIGN

RELATED APPLICATIONS

This application claims the benefit of and priority to U.S. Provisional Application Ser. No. 61/679,140, filed 3 Aug. 2012. The entire contents of said U.S. Provisional Application are incorporated herein by reference.

TECHNICAL FIELD

The present application is related to control signaling in a wireless communications network.

BACKGROUND

The $3^{rd}$-Generation Partnership Project (3GPP) has developed a third-generation wireless communications known as Long Term Evolution (LTE) technology, as documented in the specifications for the Evolved Universal Terrestrial Radio Access Network (UTRAN). LTE is a mobile broadband wireless communication technology in which transmissions from base stations (referred to as eNodeBs or eNBs in 3GPP documentation) to mobile stations (referred to as user equipment, or UEs, in 3GPP documentation) are sent using orthogonal frequency division multiplexing (OFDM). OFDM splits the transmitted signal into multiple parallel sub-carriers in frequency.

More specifically, LTE uses OFDM in the downlink and Discrete Fourier Transform (DFT)-spread OFDM in the uplink. The basic LTE downlink physical resource can be viewed as a time-frequency resource grid. FIG. 1 illustrates a portion of the available spectrum of an exemplary OFDM time-frequency resource grid 50 for LTE. Generally speaking, the time-frequency resource grid 50 is divided into one millisecond subframes. As shown in FIG. 2, each subframe includes a number of OFDM symbols. For a normal cyclic prefix (CP) length, which is suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency resource grid 50 is a resource element. A resource element consists of one OFDM subcarrier during one OFDM symbol interval.

LTE resource elements are grouped into resource blocks (RBs), which in its most common configuration consists of 12 subcarriers and 7 OFDM symbols (one slot). Thus, a RB typically consists of 84 REs. The two RBs occupying the same set of 12 subcarriers in a given radio subframe (two slots) are referred to as an RB pair, which includes 168 resource elements if a normal CP is used. Thus, an LTE radio subframe is composed of multiple RB pairs in frequency with the number of RB pairs determining the bandwidth of the signal. In the time domain, LTE downlink transmissions are organized into radio frames of 10 ms, each radio frame consisting of ten equally-sized subframes of length $T_{subframe}$=1 ms.

The signal transmitted by an eNB to one or more UEs may be transmitted from multiple antennas. Likewise, the signal may be received at a UE that has multiple antennas. The radio channel between the eNB and UE distorts the signals transmitted from the multiple antenna ports. To successfully demodulate downlink transmissions, the UE relies on reference symbols (RS) that are transmitted on the downlink. Several of these reference symbols are illustrated in the resource grid 50 shown in FIG. 2. These reference symbols and their position in the time-frequency resource grid are known to the UE and hence can be used to determine channel estimates by measuring the effect of the radio channel on these symbols.

Messages transmitted over the radio link to users can be broadly classified as control messages or data messages. Control messages are used to facilitate the proper operation of the system as well as proper operation of each UE within the system. Control messages include commands to control functions such as the transmitted power from a UE, signaling of RBs within which the data is to be received by the UE or transmitted from the UE, and so on.

Specific allocations of time-frequency resources in the LTE signal to system functions are referred to as physical channels. For example, the physical downlink control channel (PDCCH) is a physical channel used to carry scheduling information and power control messages. The physical HARQ indicator channel (PHICH) carries ACK/NACK in response to a previous uplink transmission, and the physical broadcast channel (PBCH) carries system information. The primary and secondary synchronization signals (PSS/SSS) can also be seen as control signals, and have fixed locations and periodicity in time and frequency so that UEs that initially access the network can find them and synchronize. Similarly, the PBCH has a fixed location relative to the primary and secondary synchronization signals (PSS/SSS). The UE can thus receive the system information transmitted in BCH and use that system information to locate and demodulate/decode the PDCCH, which carries control information specific to the UE.

As of Release 10 of the LTE specifications, all control messages to UEs are demodulated using channel estimates derived from the common reference signals (CRS). This allows the control messages to have a cell-wide coverage, to reach all UEs in the cell without the eNB having any particular knowledge about the UEs' positions. Exceptions to this general approach are the PSS and SSS, which are stand-alone signals and do not require reception of CRS before demodulation. The first one to four OFDM symbols of the subframe are reserved to carry such control information, as seen in FIGS. 2 and 3. The actual number of OFDM symbols reserved to the control region may vary, depending on the configuration of a particular cell.

Control messages can be categorized into messages that need to be sent only to one UE (UE-specific control) and those that need to be sent to all UEs or some subset of UEs numbering more than one (common control) within the cell being covered by the eNB. Messages of the first type (UE-specific control messages) are typically sent using the PDCCH.

Control messages of PDCCH type are demodulated using CRS and transmitted in multiples of units called control channel elements (CCEs) where each CCE contains 36 REs. A PDCCH message may have an aggregation level (AL) of 1, 2, 4 or 8 CCEs. This allows for link adaptation of the control message. Each CCE is mapped to 9 resource element groups (REGs) consisting of 4 RE each. The REGs for a given CCE are distributed over the system bandwidth to provide frequency diversity for a CCE. This is illustrated in FIG. 3. Hence, a PDCCH message can consist of up to 8 CCEs spanning the entire system bandwidth in the first one to four OFDM symbols, depending on the configuration.

Processing of a PDCCH message in an eNB begins with channel coding, scrambling, modulation, and interleaving of the control information. The modulated symbols are then mapped to the resource elements in the control region. As mentioned above, control channel elements (CCE) have been defined, where each CCE maps to 36 resource elements. By choosing the aggregation level, link-adaptation of the PDCCH is obtained. In total there are $N_{CCE}$ CCEs available for all the PDCCH to be transmitted in the subframe; the number $N_{CCE}$ may vary from subframe to subframe, depending on the number of control symbols n and the number of configured PHICH resources.

Since $N_{CCE}$ can vary from subframe to subframe, the receiving terminal must blindly determine the position of the CCEs for a particular PDCCH as well as the number of CCEs used for the PDCCH. With no constraints, this could be a computationally intensive decoding task. Therefore, some restrictions on the number of possible blind decodings a terminal needs to attempt have been introduced, as of Release 8 of the LTE specifications. One constraint is that the CCEs are numbered and CCE aggregation levels of size K can only start on CCE numbers evenly divisible by K. This is shown in FIG. 4, which illustrates CCE aggregation for aggregation levels AL-1, AL-2, AL-4, and AL-8. For example, an AL-8 PDCCH message, made up of eight CCEs, can only begin on CCEs numbered 0, 8, 16, and so on.

A terminal must blindly decode and search for a valid PDCCH over a set of CCEs referred to as the UE's search space. This is the set of CCEs that a terminal should monitor for scheduling assignments or other control information, for a given AL. Thus, in each subframe and for each AL, a terminal will attempt to decode all of the candidate PDCCHs that can be formed from the CCEs in its search space. If the Cyclic Redundancy Check (CRC) for the attempted decoding checks out, then the contents of the candidate PDCCH are assumed to be valid for the terminal, and the terminal further processes the received information. Note that two or more terminals may have overlapping search spaces, in which case the network may have to select only one of them for scheduling of the control channel. When this happens, the non-scheduled terminal is said to be blocked. The search spaces for a UE vary pseudo-randomly from subframe to subframe to reduce this blocking probability.

For Release 11 of the LTE specifications, it has been agreed to introduce UE-specific transmission of control information in the form of enhanced control channels. This is done by allowing the transmission of control messages to a UE where the transmissions are placed in the data region of the LTE subframe and are based on UE-specific reference signals. Depending on the type of control message, the enhanced control channels formed in this manner are referred to as the enhanced PDCCH (ePDCCH), enhanced PHICH (ePHICH), and so on.

For the enhanced control channel in Release 11, it has been further agreed to use antenna port $p \in \{107, 108, 109, 110\}$ for demodulation, which correspond with respect to reference symbol positions and set of sequences to antenna ports $p \in \{7, 8, 9, 10\}$, i.e., the same antenna ports that are used for data transmissions on the Physical Data Shared Channel (PDSCH), using UE-specific RS. This enhancement means that the precoding gains already available for data transmissions can be achieved for the control channels as well. Another benefit is that different physical RB pairs (PRB pairs) for enhanced control channels can be allocated to different cells or to different transmission points within a cell. This can be seen in FIG. 5, which illustrates ten RB pairs, three of which are allocated to three separate ePDCCH regions comprising one PRB pair each. Note that the remaining RB pairs can be used for PDSCH transmissions. The ability to allocate different PRB pairs to different cells or different transmission points facilitates inter-cell or inter-point interference coordination for control channels. This is especially useful for heterogeneous network scenarios, as will be discussed below.

The same enhanced control region can be used simultaneously by different transmission points within a cell or by transmission points belonging to different cells, when those points are not highly interfering with one another. A typical case is the shared cell scenario, an example of which is illustrated in FIG. 6. In this case, a macro cell 62 contains several lower power pico nodes A, B, and C within its coverage area 68, the pico nodes A, B, C having (or being associated with) the same synchronization signal/cell ID. In pico nodes which are geographically separated, as is the case with pico nodes B and C in FIG. 6, the same enhanced control region, i.e., the same PRBs used for the ePDCCH, can be re-used. With this approach, the total control channel capacity in the shared cell will increase, since a given PRB resource is re-used, potentially multiple times, in different parts of the cell. This ensures that area splitting gains are obtained. An example is shown in FIG. 7, which shows that pico nodes B and C share the enhanced control region whereas A, due to its proximity to both B and C, is at risk of interfering with the other pico nodes and is therefore assigned an enhanced control region which is non-overlapping. Interference coordination between pico nodes A and B, or equivalently transmission points A and B, within a shared cell is thereby achieved. Note that in some cases, a UE may need to receive part of the control channel signaling from the macro cell and the other part of the control signaling from the nearby Pico cell.

This area splitting and control channel frequency coordination is not possible with the PDCCH, since the PDCCH spans the whole bandwidth. Further, the PDCCH does not provide possibility to use UE specific precoding since it relies on the use of CRS for demodulation.

FIG. 8 shows an ePDCCH which is divided into multiple groups and mapped to one of the enhanced control regions. This represents a "localized" transmission of the ePDCCH, since all of the groups making up the ePDCCH message are grouped together in frequency. Note that these multiple groups are similar to the CCEs in the PDCCH. Also note that, as seen in FIG. 8, the enhanced control region does not start at OFDM symbol zero. This is to accommodate the simultaneous transmission of a PDCCH in the subframe. However, as was mentioned above, there may be carrier types in future LTE releases that do not have a PDCCH at all, in which case the enhanced control region could start from OFDM symbol zero within the subframe.

While the localized transmission of ePDCCH illustrated in FIG. 8 enables UE-specific precoding, which is an advantage over the conventional PDCCH, in some cases it may be useful to be able to transmit an enhanced control channel in a broadcasted, wide area coverage fashion. This is particularly useful if the eNB does not have reliable information to perform precoding towards a certain UE, in which case a wide area coverage transmission may be more robust. Another case where distributed transmission may be useful is when the particular control message is intended for more than one UE, since in this case UE specific precoding cannot be used. This is the general approach taken for transmission of the common control information using PDCCH (i.e. in the common search space (CSS)).

Accordingly, a distributed transmission over enhanced control regions can be used, instead of the localized transmission shown in FIG. 8. An example of distributed transmission of the ePDCCH is shown in FIG. 9, where the four parts belonging to the same ePDCCH are distributed over the enhanced control regions.

3GPP has agreed that both localized and distributed transmission of an ePDCCH should be supported, these two approaches corresponding generally to FIGS. 8 and 9, respectively.

When distributed transmission is used, then it is also beneficial if antenna diversity can be achieved to maximize the diversity order of an ePDCCH message. On the other hand, sometimes only wideband channel quality and wideband precoding information are available at the eNB, in which case it could be useful to perform a distributed transmission but with UE specific, wideband, precoding.

SUMMARY

The techniques and apparatus disclosed herein provide a way to support both localized and distributed search spaces in the same control region, and include means to configure the amount of resources allocated for each type, with minimized impact on PDSCH scheduling flexibility. In some embodiments, as detailed below, this is done by configuring the number of RBGs occupied by the control region and introducing a UE-specific pointer that divides the control channel region into multiple parts, i.e., into a distributed part and a localized part. In some embodiments, multiple pointers are used to support multiplexing of multiple types of control channels in the same enhanced control region. In some embodiments, the eCCEs in the localized part are numbered in reversed order, enabling higher aggregation levels of localized ePDCCH transmissions with limited impact on the search space design. By spanning the localized part of the search space over multiple sets in a cluster, aggregation levels above four may be mapped to multiple adjacent PRBs to maximize scheduling gain for the given resource utilization.

Specific embodiments of the techniques disclosed in detail below include methods and corresponding apparatus. An example method, in a user equipment, for receiving control information in a radio communications network in which the user equipment is served in a cell controlled by a radio network node, begins with receiving a downlink signal comprising an enhanced control region consisting of at least two sets of physical resource block (PRB) pairs, each PRB pair consisting of a group of non-overlapping physical layer building blocks. The method continues with the forming of one or more distributed enhanced control-channel elements (eCCEs) from a first set of PRB pairs by aggregating physical layer building blocks from multiple PRB pairs to form each distributed eCCE. One or more localized eCCEs are formed from a second set of PRB pairs by aggregating physical layer building blocks such that each of the localized eCCEs is formed from physical layer building blocks from within a single PRB pair of the second set. First control channel message candidates are formed from the distributed eCCEs and second control channel message candidates are formed from the localized eCCEs. These control channel message candidate messages are then decoded to search for a valid control channel message.

In some embodiments of this example method, the communications network is a Long-Term Evolution (LTE) radio network and the physical layer building blocks are enhanced Resource Element Groups (eREGs), each eREG consisting of eight or nine resource elements. In some embodiments, the first and second control channel message candidates are formed by aggregating two or more of the localized eCCEs or two or more of the distributed eCCEs. In some embodiments, the method further comprises receiving Radio Resource Control (RRC) signaling that indicates a division of the PRB pairs into the first and second sets of PRB pairs.

In some embodiments, a third set of PRB pairs has a localized part and a distributed part, in which case the example method summarized above may further include forming one or more additional distributed eCCEs from the third set of PRB pairs by aggregating physical layer building blocks from multiple PRB pairs to form each additional distributed eCCE and forming one or more additional localized eCCEs from the third set of PRB pairs by aggregating physical layer building blocks such that each additional localized eCCE is formed from physical layer building blocks from within a single PRB pair of the third set. One or more third control channel message candidates are then formed from the additional distributed eCCEs and one or more fourth control channel message candidates are formed from the additional localized eCCEs; these third and fourth control channel message candidates are also decoded to search for a valid control channel message. In some of these embodiments, RRC signaling may be used to indicate a division point in the third set of PRB pairs, the division point splitting the third set into a first portion used to form the additional localized eCCEs and a second portion used to form the additional distributed eCCEs.

Other embodiments include methods, carried out in a radio network node, for sending control information in a radio communications network in which a plurality of user equipment are served in a cell controlled by the radio network node. The radio network node transmits a downlink signal comprising an enhanced control region consisting of at least two sets of PRB pairs, each PRB pair consisting of a group of non-overlapping physical layer building blocks. The method comprises mapping one or more first control channel messages to distributed eCCEs in a first set of PRB pairs, where each distributed eCCE consists of an aggregation of physical layer building blocks from multiple PRB pairs, and mapping one or more second control channel messages to localized eCCEs in a second set of PRB pairs, where each localized eCCE consists of an aggregation of physical layer building blocks from within a single PRB pair. The first control channel messages and the second control channel messages are then transmitted in a subframe of the downlink signal.

In some embodiments, the mapping of at least some of the first and second control channel messages to the distributed eCCEs and the localized eCCEs comprises mapping a control channel message to an aggregation of two or more localized eCCEs or two or more distributed eCCEs. Some embodiments further comprise the transmission of RRC signaling that indicates a division of the PRB pairs into the first and second sets of PRB pairs. In some embodiments, one or more third control channel messages are mapped to distributed enhanced control-channel elements, eCCEs, in a third set of PRB pairs, where each distributed eCCE consists of an aggregation of physical layer building blocks from multiple PRB pairs, and one or more fourth control channel messages are mapped to localized eCCEs in the third set of PRB pairs, where each localized eCCE consists of an aggregation of physical layer building blocks from within a single PRB pair. In these embodiments, the third control channel messages and the fourth control channel messages are also transmitted in the subframe of the downlink signal. RRC signaling may be transmitted to indicate a division point in the third set of PRB pairs, the division point splitting the third set into a first portion used for control channel messages mapped to localized eCCEs and a second portion used for control channel messages mapped to distributed eCCEs.

Still other embodiments include user equipment apparatus and base station apparatus adapted to carry out one or more of the methods summarized above and detailed below, as well as corresponding computer program products. Of course, the techniques and apparatus described herein are not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
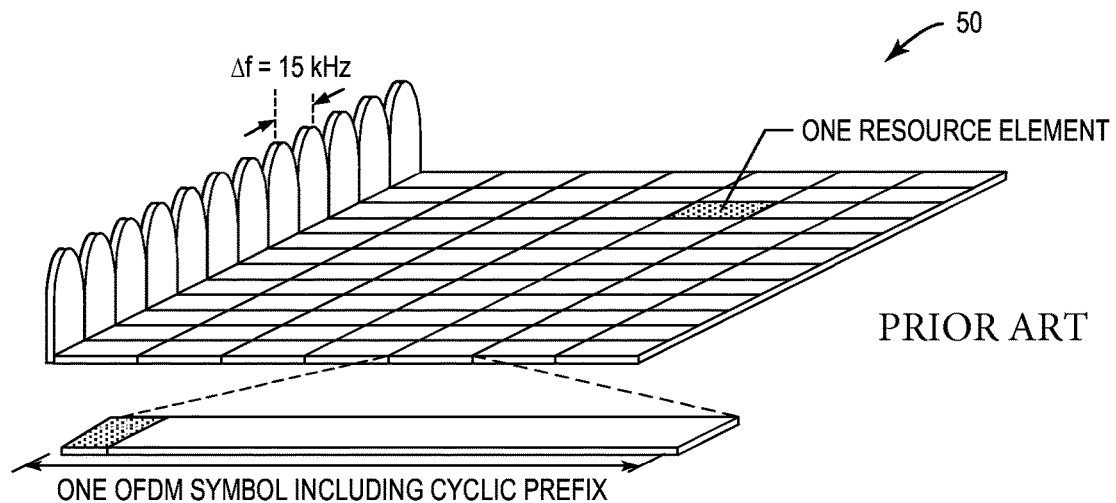
FIG. 1 illustrates the time-frequency resource grid of an OFDM signal.
Figure 2:
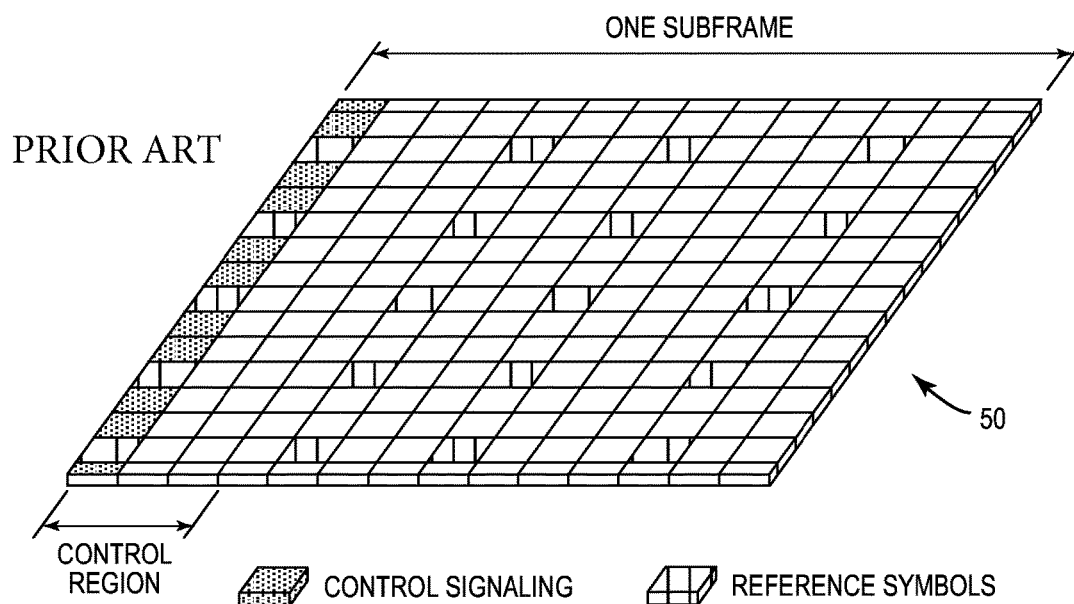
FIG. 2 illustrates a subframe of an LTE signal.
Figure 3:
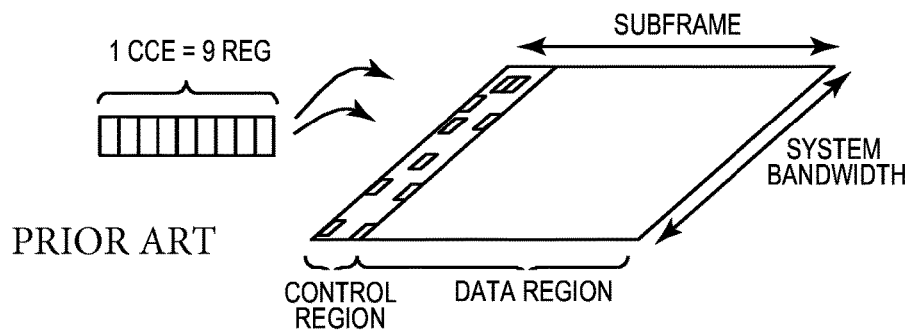
FIG. 3 illustrates the mapping of a CCE to the control region of an LTE subframe.
Figure 4:
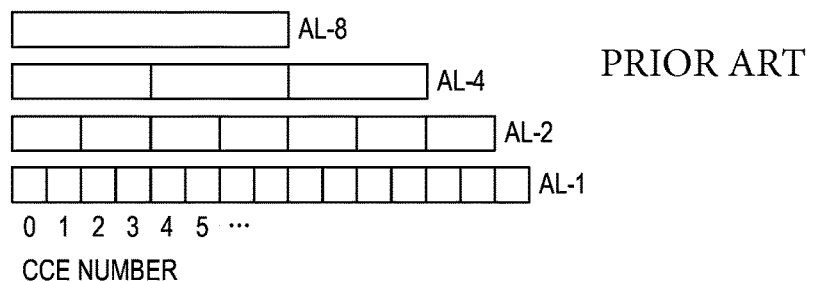
FIG. 4 illustrates the aggregation of CCEs into control channel messages.
Figure 5:
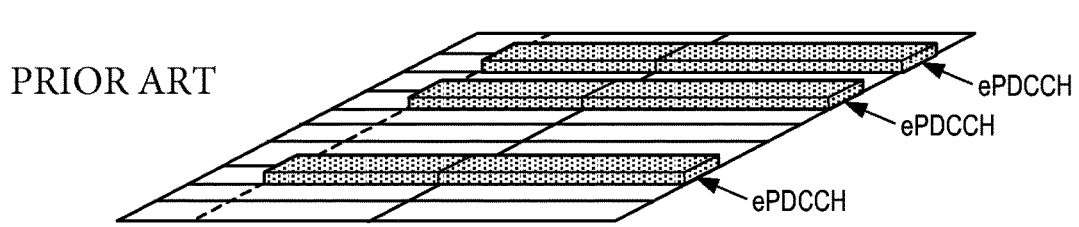
FIG. 5 illustrates the mapping of an example enhanced control channel region to an LTE subframe.
Figure 6:
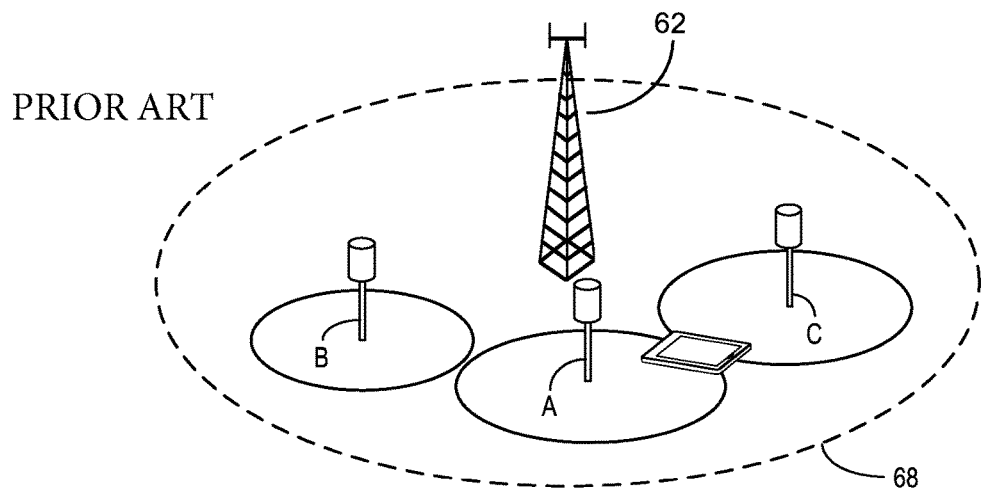
FIG. 6 illustrates an example heterogeneous network.
Figure 7:
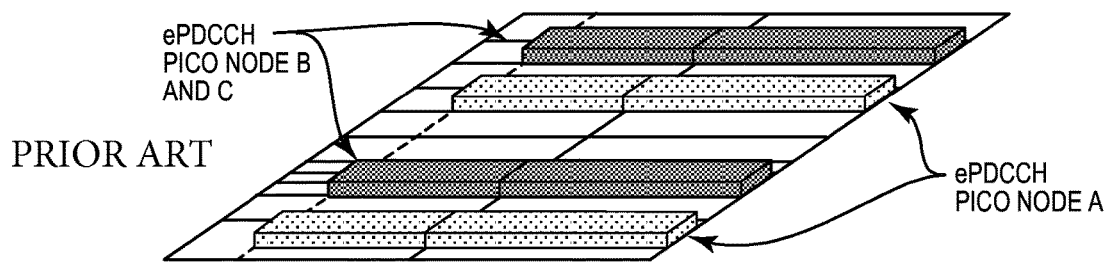
FIG. 7 illustrates an allocation of ePDCCH to pico nodes in a heterogeneous network.
Figure 8:
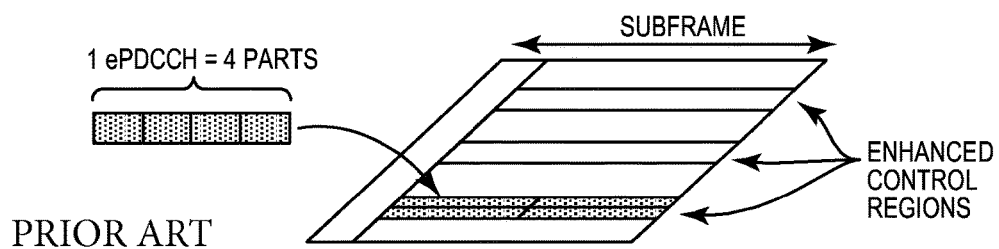
FIG. 8 illustrates the localized mapping of an ePDCCH to an enhanced control region.
Figure 9:
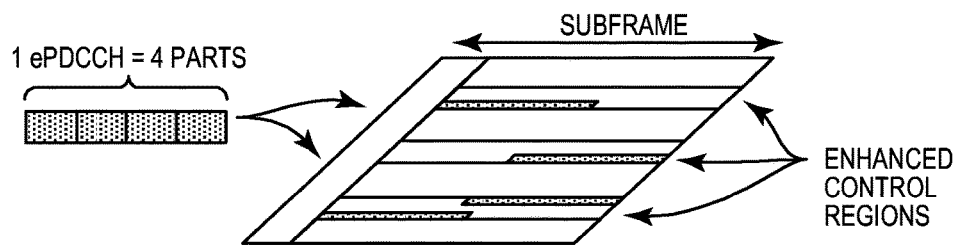
FIG. 9 illustrates the distributed mapping of an ePDCCH to enhanced control regions.
Figure 10:
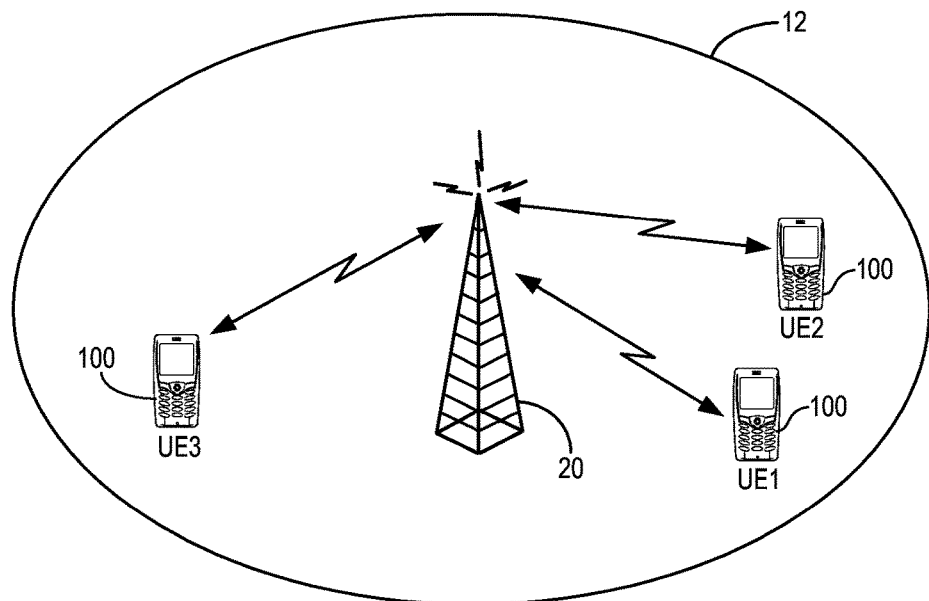
FIG. 10 illustrates an example radio communications network in which several of the presently disclosed techniques may be applied.

Referring now to the drawings, FIG. 10 illustrates an exemplary mobile communication network 10 for providing wireless communication services to mobile stations 100. Three mobile stations 100, which are referred to as "user equipment" or "UE" in LTE terminology, are shown in FIG. 10. The mobile stations 100 may comprise, for example, cellular telephones, personal digital assistants, smart phones, laptop computers, handheld computers, or other devices with wireless communication capabilities. It should be noted that the terms "mobile station" or "mobile terminal," as used herein, refer to a terminal operating in a mobile communication network and do not necessarily imply that the terminal itself is mobile or moveable. Thus, the terms may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is generally referred to in LTE as an Evolved NodeB (eNodeB). One base station 20 may provide service in multiple geographic cell areas or sectors 12. The mobile stations 100 receive signals from base station 20 on one or more downlink (DL) channels, and transmit signals to the base station 20 on one or more uplink (UL) channels.

For illustrative purposes, several embodiments will be described in the context of a Long-Term Evolution (LTE) system. Those skilled in the art will appreciate, however, that the presently disclosed techniques may be more generally applicable to other wireless communication systems, including, for example, WiMax (IEEE 802.16) systems.

As mentioned above, 3GPP has agreed that both distributed and localized transmission of an ePDCCH should be supported in forthcoming releases of the standards for LTE. To accommodate distributed transmission of enhanced control channels as well as supporting multiple options for localized transmission, a set of PRB pairs distributed in frequency has to be allocated for the enhanced control region. To support higher control channel capacity than provided by a single set of PRB pairs, multiple sets may be allocated for the enhanced control region. Note that this allocation may be done on a UE-specific basis, i.e., different allocations for different UEs may be allocated simultaneously.

Figure 11:
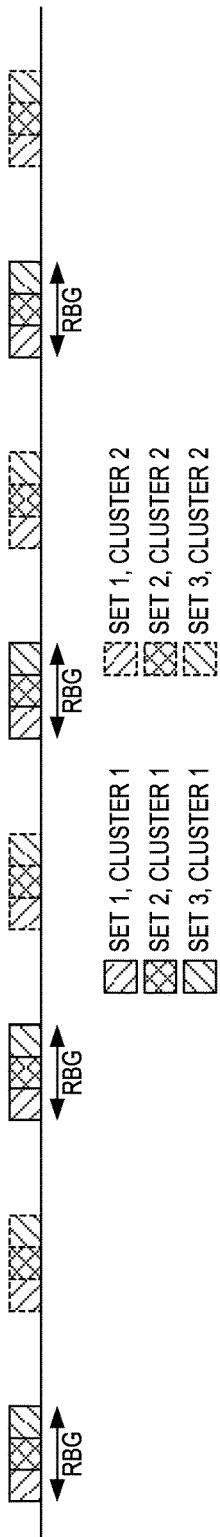
FIG. 11 shows the mapping of PRBs in multiple RBGs to sets of PRB pairs.

Since PRB pairs used for PDSCH transmission often are allocated in terms of Resource Block Groups (RBGs), which are groups of PRB pairs contiguous in frequency, it is beneficial to limit the number of RBGs that contain the enhanced control region for a given capacity. This is achieved by allocating multiple sets of PRB pairs from the same RBGs to the enhanced control channel. The group of RBG forming the multiplicity of sets is referred to as a cluster. Even though a PRB pair is part of the enhanced control region it may be used for PDSCH if no other transmissions takes place. An example of this described division of resources is illustrated in FIG. 11. In the illustrated example, there are three PRB pairs per RBG. The number of sets (3) of PRB pairs equals the RBG size. The number of RBGs per cluster is four, which means that there are four PRB pairs per set. A distributed ePDCCH transmission is mapped within one set. If additional control resources are needed, then additional clusters can be configured.

Figure 12:
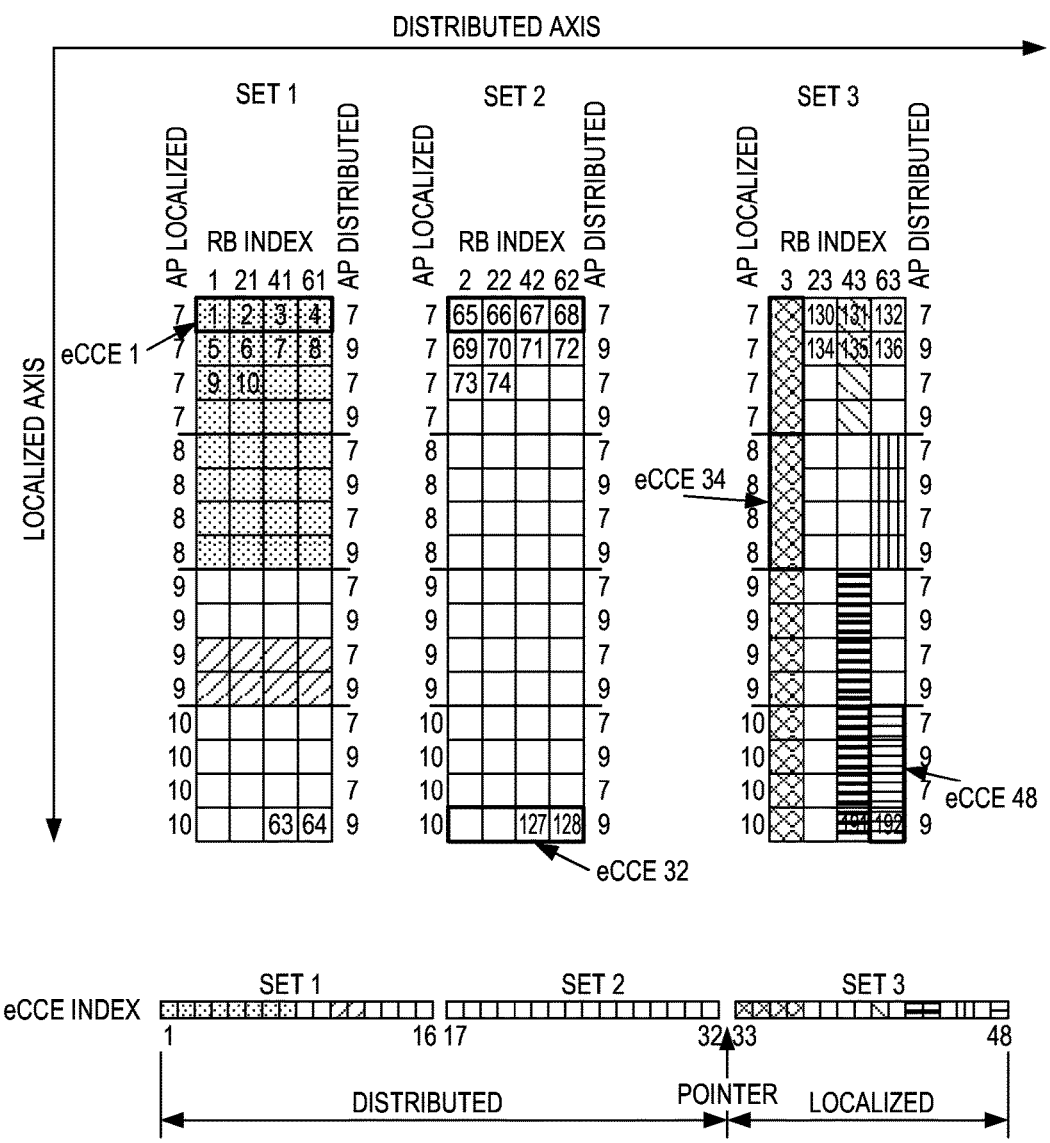
FIG. 12 is an example mapping of eCCEs to eREGs and PRBs, according to some embodiments.

An ePDCCH control region as defined by the 3GPP specifications for LTE consists of one or several sets of PRB pairs. Each PRB pair is further divided into eREGs, forming a two-dimensional grid, as shown in FIG. 12. The eREG is the physical layer building block for an enhanced control channel, and includes nine REs; there are 16 eREGs per PRB pair. In FIG. 12, each square represents an eREG; these are numbered from 1 to 192 in this example. Each column is a PRB pair. Note that the gaps in numbering between the PRB pairs in each set indicates that these PRB pairs are separated apart from one another (in the frequency domain), i.e., the PRB pairs within a set are frequency-diverse. This example corresponds to the example illustration of three sets of PRB pairs shown in FIG. 11.

Two types of eCCEs are defined, distributed and localized eCCEs, to support both kinds of transmissions. eCCEs for distributed transmission are made up of eREGs aggregated along the distributed axis, i.e., across multiple PRB pairs within a set, in order to obtain frequency diversity for an ePDCCH message of an aggregation level of one eCCE. eCCEs for localized transmission are constituted by eREGs aggregated along the localized axis, i.e., within PRB pairs. Examples of both are shown in FIG. 12. A pointer is used to divide the region into a distributed and localized part where the eREGs of each part are combined to form eCCEs of distributed or localized type respectively. In this example, the pointer divides eREG1-eREG128 to the distributed part and eREG 129-192 to belong to the localized part. Thus, eCCEs 1-32 are in the distributed part, while eCCEs 33-48 are in the localized part.

The eCCE labeled "eCCE1" is a distributed eCCE, as it is made up of eREGs from PRB pairs 1, 21, 41, and 61. Eight of these eCCEs can be aggregated to form a single ePDCCH, as shown by the upper shaded region in Set 1, which consists of eCC1-eCC8 (equivalently eREG1-eREG32). The lower shaded region in Set 1 illustrates the aggregation of two distributed eCCEs (eCCE11 and eCCE12) to form a second ePDCCH.

In contrast, the eCCE labeled "eCCE48", at the end of Set 3, is a localized eCCE, consisting of eREGs from only PRB pair 63. The shaded regions in Set 3 illustrate ePDCCHs aggregated in levels of 1, two, and four eCCEs.

Thus, as shown in the example pictured in FIG. 12, all the eCCEs mapped to the enhanced control region are numbered, forming a linear eCCE space. Higher aggregation levels of ePDCCH are obtained by combining resources of consecutive eCCEs in the eCCE space. The enhanced control region can be divided into two parts, a localized and distributed part by configuring a pointer in the eCCE space, where the eCCEs and eREGs belonging to the first part are aggregated in the distributed way as explained above and, in the second part, the eCCEs and eREGs are aggregated in the localized way. The opposite approach is also possible, of course, where eREGs/eCCEs in the first part are aggregated locally and eREGs/eCCEs in the second part are aggregated in a distributed manner. The first approach is shown in the example illustrated in FIG. 12, where the lowest numbered eCCEs are distributed and the highest numbered eCCEs are localized.

If separate PRB pairs for distributed and localized eCCEs are desired, the pointer is simply inserted between two sets of PRB pairs and in this case localized and distributed ePDCCH transmissions are not multiplexed in the same PRB pair. This is the approach shown in FIG. 12, where the pointer is inserted between Sets 2 and 3. On the other hand, for small system bandwidths or a limited number of served users it is beneficial from a control overhead point of view to have some PRB pairs that support simultaneous transmission of distributed and localized ePDCCHs, which is obtained by configuring the pointer so that it divides the available eREGs in a PRB pair into two groups.

The pointer used to divide the ePDCCH resources into distributed and localized parts may be signaled to mobile terminals on a UE-specific basis, using Radio Resource Control (RRC) signaling, for example. Alternatively, the division can be fixed in the specifications, e.g., depending on the number of configured control channel resources for the UE.

Figure 13:
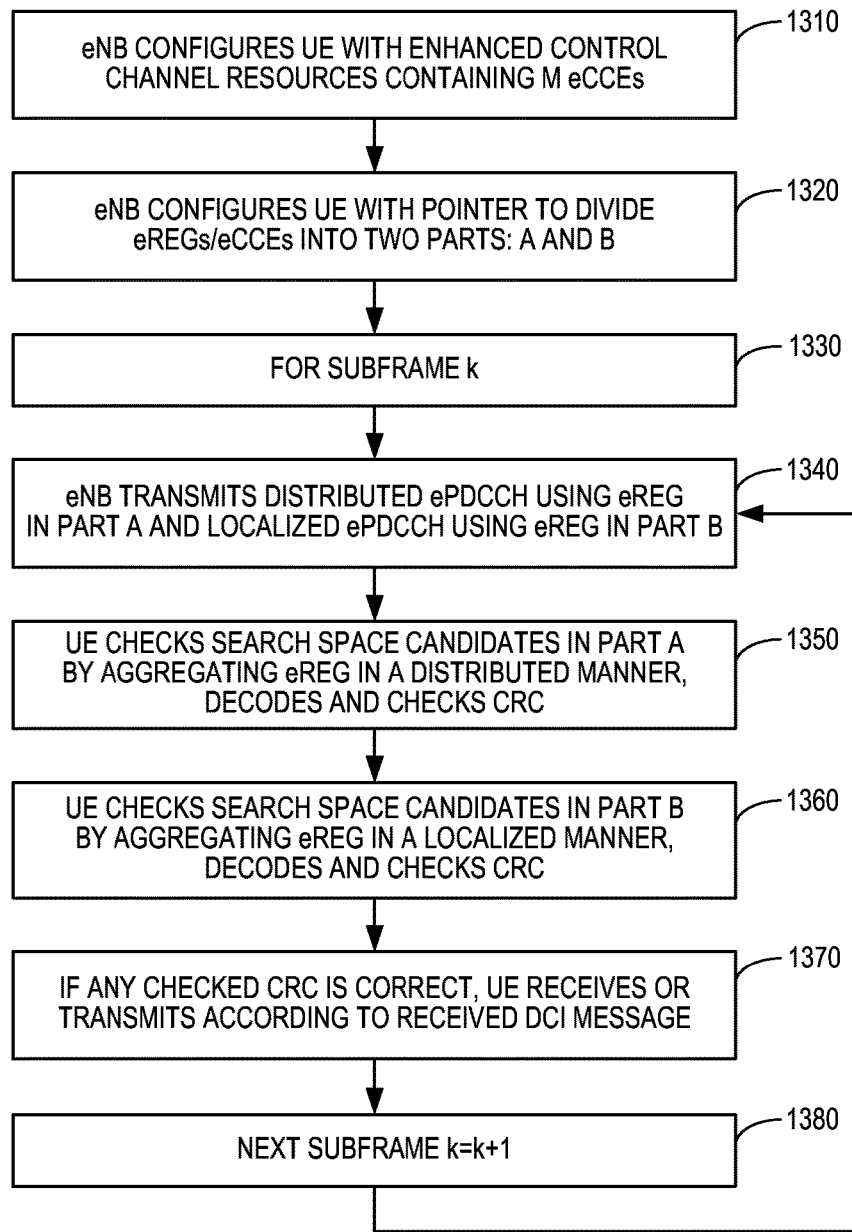
FIG. 13 is an example process flow for managing enhanced control channel signals according to some embodiments.

FIG. 13 shows an example of the procedures carried out in an eNB and an UE, according to some embodiments. As shown at block 1310, the eNB configures the UE with enhanced control channel resources containing M eCCEs. As seen at block 1320, the eNB also configures the UE with a pointer to divide the enhanced control channel resources, which comprises eREGs and eCCEs, into two parts, parts A and B. As discussed earlier, this configuration may be carried out via RRC signaling, in some embodiments. In other systems, the location of the pointer may be defined by specification and/or determined by rule, based on the enhanced control channel resources allocated to the UE.

While blocks 1310 and 1320 of FIG. 13 illustrate an initial configuration of a UE, the remaining blocks illustrate a process carried out for each downlink subframe. Thus, for a given subframe k (block 1330), the eNB transmits distributed ePDCCH using eREG in the first part and simultaneously transmits localized ePDCCH using eREG in the second part. This is shown at block 1340. Next, as shown at blocks 1350 and 1360, the UE searches the search space for ePDCCH by assembling ePDCCH candidates in the search space. As shown in block 1350, for part A of the enhanced control channel resources, the UE aggregates eREG in an distributed manner to form eCCEs and ePDCCH. The UE then decodes the candidate ePDCCH and checks the CRC to determine whether an ePDCCH intended for the UE has been detected. Likewise, as shown in block 1360, the UE aggregates eREG in a localized manner for part B of the resources, to form candidate ePDCCH, and checks the CRC to determine whether an ePDCCH intended for the UE has been detected. As shown at block 1370, if any checked CRC is correct, the UE receives or transmits according to the Downlink Control Information (DCI) decoded from the ePDCCH. The process is then repeated for the next subframe, subframe k+1, as shown at block 1380.

Figure 14:
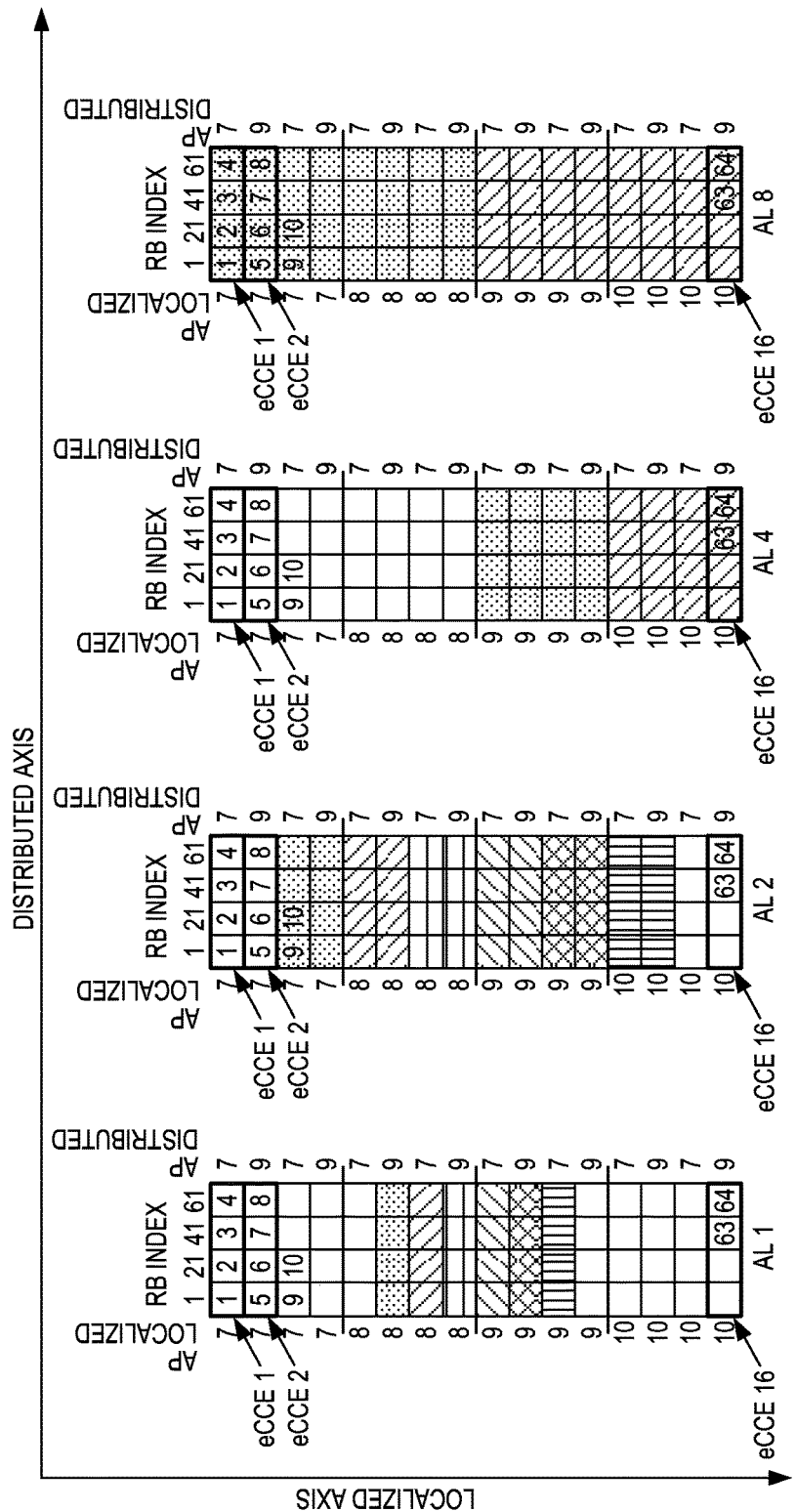
FIGS. 14 and 15 show the aggregation of eREGs into eCCEs according to a distributed technique and a localized technique, respectively.

According to some embodiments, then, in order to limit channel estimation complexity and frequency footprint for distributed mode, the search space on one side of the configured pointer consists of ePDCCH candidates aggregated along the distributed axis. FIG. 14 illustrates examples of this aggregation, for aggregation levels 1, 2, 4 and 8. The leftmost part of FIG. 14 shows aggregations of AL=1, where four eREGs (1 eCCE) are aggregated, while the rightmost part shows aggregations of AL=8. The shaded aggregations illustrate the search space for each aggregation level, where each shaded aggregation represents an ePDCCH candidate in the search space for the respective aggregation level.

Figure 15:
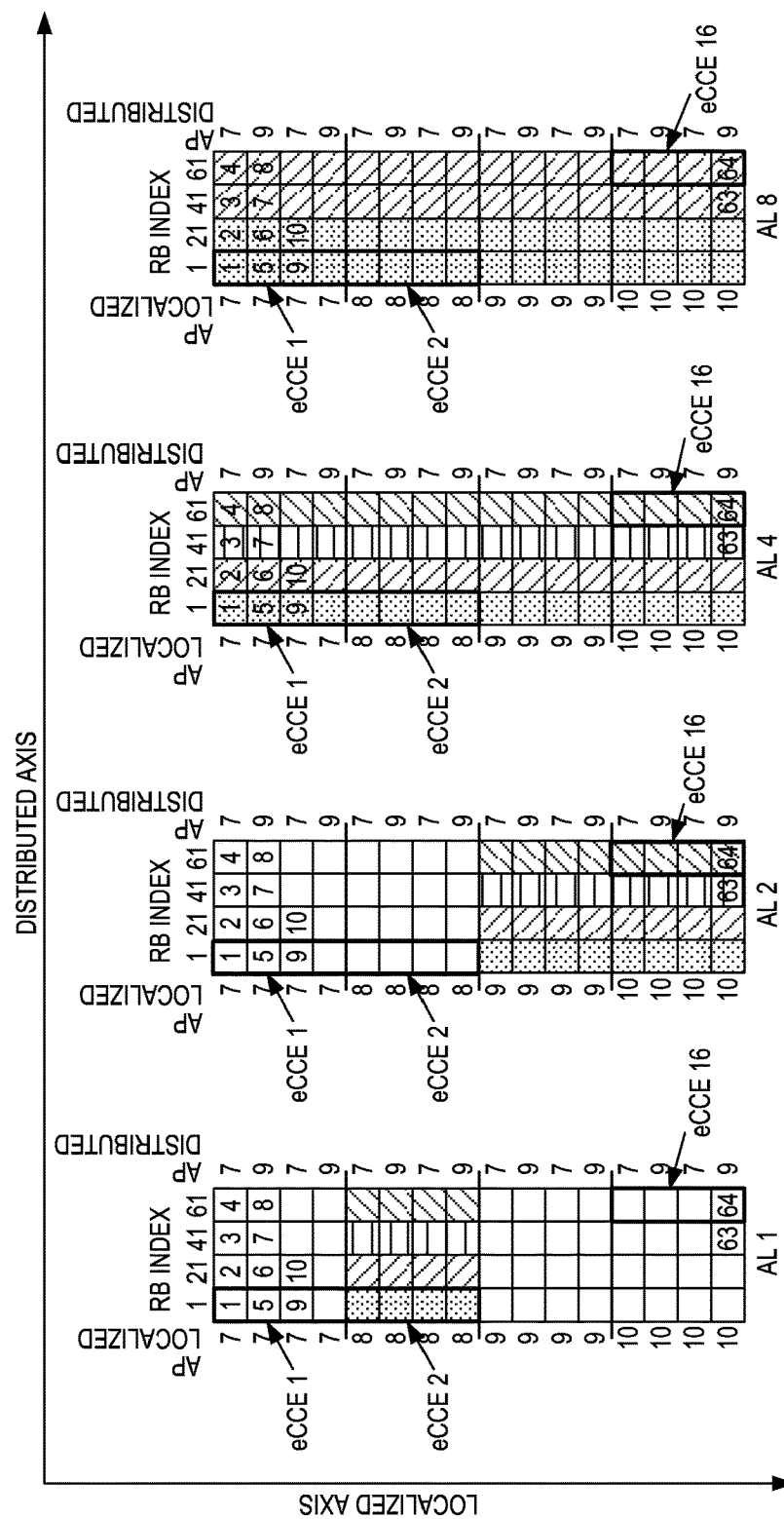

To maximize the scheduling gain in frequency domain, the search space for localized transmission on the other side of the configured pointer consists of candidates aggregated along the localized axis. This is shown in FIG. 15, which also illustrates aggregation levels 1, 2, 4, and 8. Again, the shaded aggregations illustrate the search space for each aggregation level.

More generally, in various embodiments the control channel resources are separated into at least two regions. In one region, multiple "chunks" of time-frequency resources (which "chunks" are aggregations of non-overlapping, often adjacent, time-frequency resource elements) are aggregated together in a localized fashion, i.e., the multiple chunks in a given aggregation are taken from within a single group of frequency- and time-adjacent resources. The aggregated chunks form a single control channel resource (an eCCE in LTE) that can be used to encode/transmit (in the case of a base station) or to receive/decode (in the case of a mobile station) a control channel message. In the other region, multiple chunks are aggregated together in a distributed fashion, i.e., the multiple chunks in a given aggregation are taken from multiple groups of time-frequency resources, where each group is separated in frequency from the others.

Note that in the scenario illustrated in FIG. 12, described in detail above, the distributed aggregation is performed in the region having lower-numbered resources, while the localized aggregation is performed in the region having higher-numbered resources. It should be appreciated that the reverse could be done instead.

In many of these embodiments, the separation of resources configured for use as control channel resources into multiple regions is facilitated by a "pointer," which is signaled to the mobile (i.e., "configured") by the base station. This pointer is a data element that indicates a dividing point in the control channel resources, to divide (or partition) the configured time-frequency resources into two (or more) regions.

Figure 16:
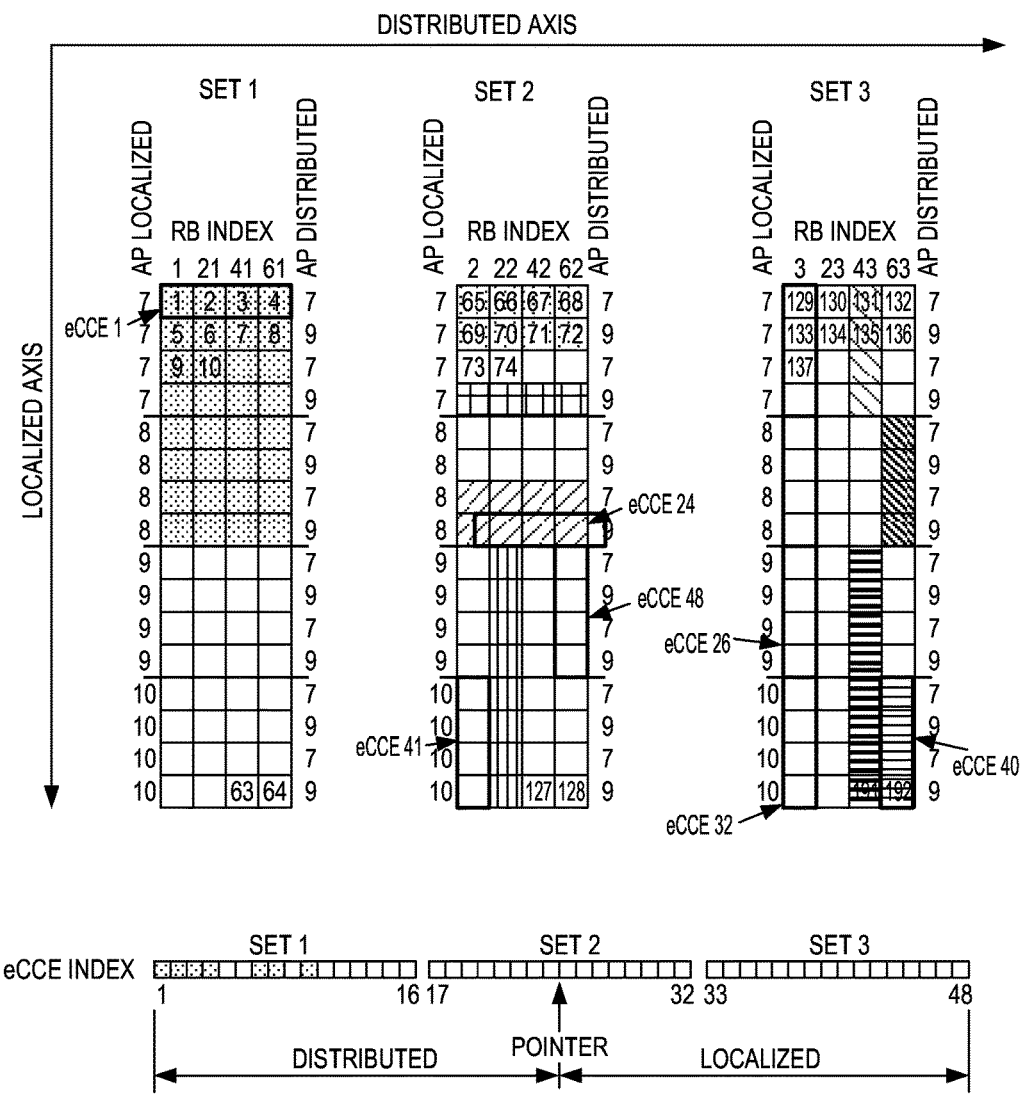
FIG. 16 shows another example mapping of eCCEs to eREGs and PRBs, according to some embodiments.

In some embodiments it may be beneficial to number the localized eCCEs in reversed order to maintain a structure with an eCCE numbering system that always starts at a set border, particularly in cases when the configured pointer is put within a set of PRB pairs, instead of between sets. An example of this approach is shown in FIG. 16, where the localized eCCEs are numbered from the bottom right of Set 3, with eCCE25, and continue to eCCE 48 in the middle of Set 2. As seen in FIG. 16, the starting eCCE position (eCCE 40) for forming candidate ePDCCHs from the localized eCCEs and the starting point (eCCE1) for the distributed eCCEs are at or near opposite ends of the range of numbered eCCEs, such that the second control channel messages are formed by traversing the numbered eCCEs in a reverse order from that used for forming the first control channel messages.

This approach solves the problem with higher aggregation levels at the start of the localized eCCE space not being able to fit within one PRB pair. In other words (and somewhat more generally), it may be beneficial to begin allocating the control channel resources in the region designated for localized aggregation at the "end" of the region that is furthest away from the dividing point. This is done in the base station for the purpose of assembling, encoding, and transmitting control channel messages, as well as in the mobile station for identifying eCCE boundaries and working through the eCCE search space. As seen in FIG. 16, this increases the working "space" before a PRB pair boundary is encountered, which maximizes the number of high-aggregation-level eCCEs that can be formed without splitting the eCCE between two PRB pairs or skipping one or more time-frequency resources.

Figure 17:
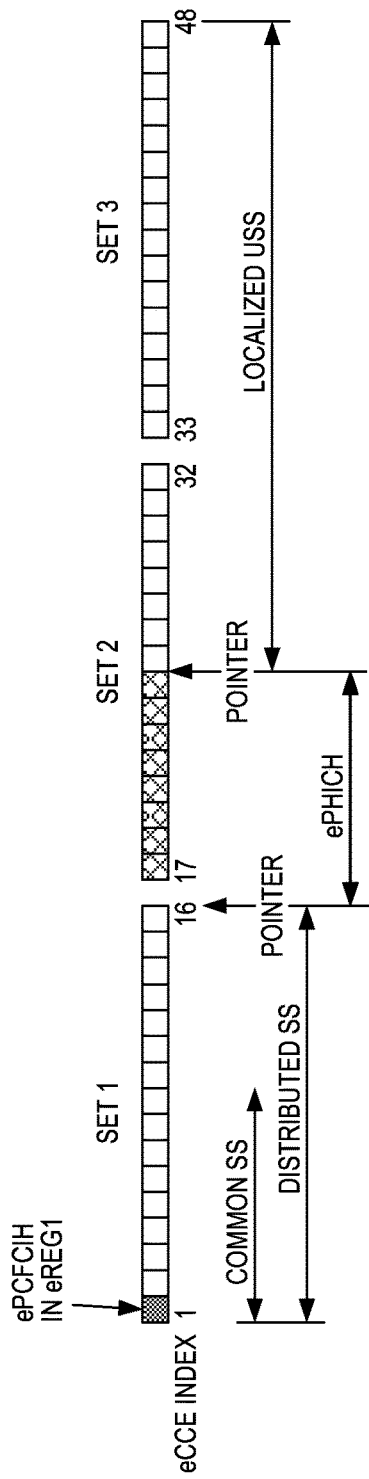
FIG. 17 illustrates an example enhanced control region that supports the multiplexing of multiple types of enhanced control channel regions.

It should be appreciated that the concept of using eREGs as a common basic building block can be extended to other control channels than ePDCCH, such as ePBCH, ePCFICH or ePHICH. In order to limit control channel overhead, especially at low load, it is beneficial to be able to multiplex multiple types of control channel configurations in the same set of resources. This is solved by the use of multiple pointers to split the space in several parts. An example of this approach is illustrated in FIG. 17, which shows the division of eCCEs into three regions—a distributed search space (part of which may be a common search space), a localized UE-specific search space (USS), and an intermediate space reserved for ePHICH.

Figure 18:
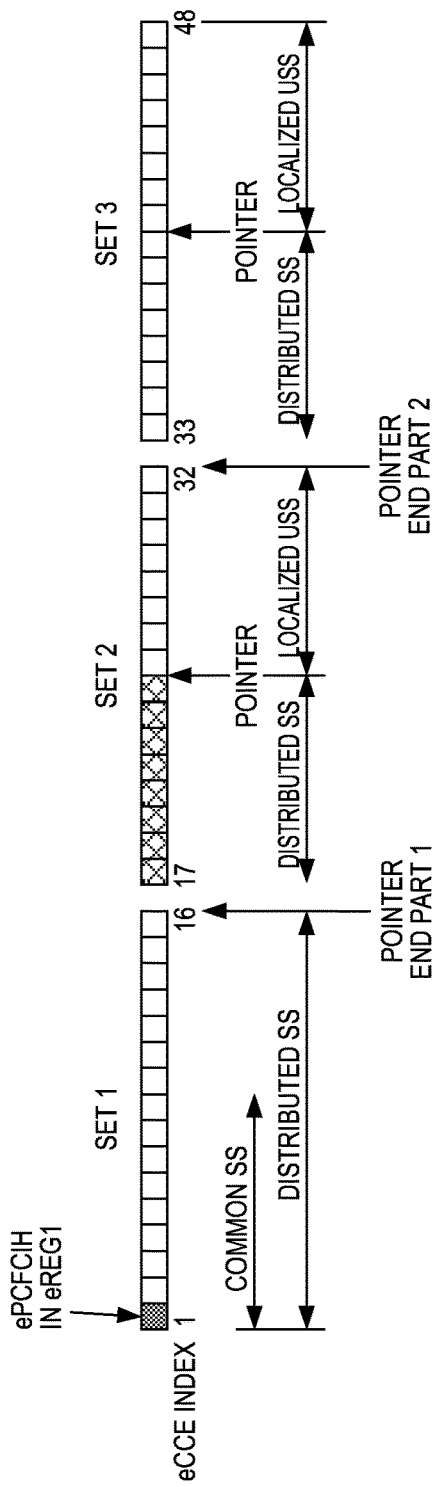
FIG. 18 illustrates another example enhanced control region, supporting several partitions that are divided into distributed and localized parts.

Performance benefits may be possible in some cases by partitioning the enhanced control region monitored by a single UE into multiple control regions that are all monitored by the UE for the purpose of receiving a single control channel such as the ePDCCH. In this approach, multiple pointers are used to indicate the number of search space partitions and their starting and stopping positions. Each of the partitions is then independently split into two parts, the first for distributed allocations and the second for localized allocations. Both the portioning of the control region and the sub-partitions for distributed and localized allocations are performed in a UE-specific manner. This approach is illustrated in FIG. 18 where three partitions are shown. The first partition is allocated entirely to a distributed search space, while the other two partitions are each divided into a distributed part and a localized part.

In a further aspect of this approach, a pointer may be used to signal the end of the entire control region. This pointer may be used in conjunction with signaling of the RBG clusters to be used by the UE for the enhanced control region. This combination of signaling RBG clusters and a pointer results in an efficient signaling mechanism, while allowing for the possibility that the control region uses only a part of the last RBG cluster and thus providing more flexibility in defining the size of the control region. For example, for the case of a system bandwidth of 100 RBs, the RBG size is 4 PRBs. Thus, when the control region is signaled by the eNB to a UE, it can signal either one or two clusters. One cluster would result in 4 sets (equal to PRB size)×4 PRBs per set resulting in 16 PRBs. Two clusters would result in 32 PRBs. One cluster may be too few PRBs and two clusters may be unnecessarily large. In this situation, the use of a control region end pointer can signal to the UE where the control region ends in the last cluster. This results in low overhead and ability to define control regions flexibly.

The number of blind decodings that can be performed by the UE is limited, due to complexity constraints. In some embodiments of the present techniques, the blind decoding candidates are distributed, so that a UE may have to monitor ePDCCH candidates in each of multiple control region partitions. For example, in some embodiments each UE has at least one blind decoding candidate in each of the defined partitions.

Figure 19:
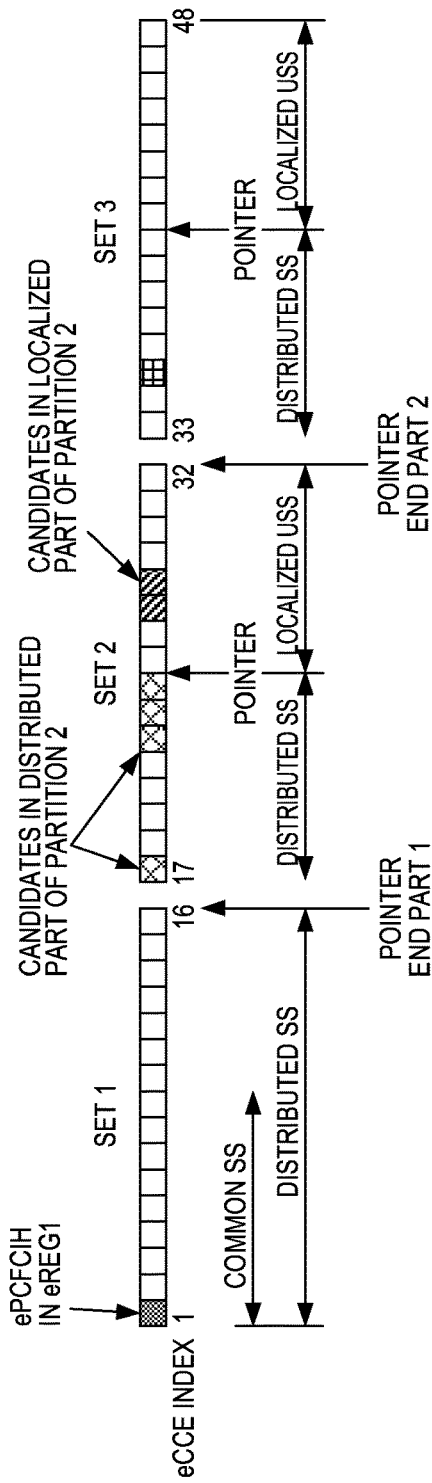
FIG. 19 illustrates the application of an independent randomization procedure within each distributed or localized part of a control region partition.

In Release 8 of LTE, blind decoding candidates are determined using a randomization process whereby a starting CCE position within the control region is determined based on the UE RNTI and the subframe number. The number of blind decoding candidates that need to be monitored are then chosen sequentially from this starting CCE position. The randomization is performed so that the blind decoding candidates vary in every subframe. A similar approach can be used with the presently disclosed techniques and apparatus, such that a similar randomization procedure is performed within each distributed or localized region within each partition of the control region. The procedure is followed independently for each such subregion as though it was a whole Release 8 control region. An example of this approach is shown in FIG. 19. Note that in this case, the partitions are the same as the sets of PRB pairs, but this need not be the case in general.

Specifically, one of the values used by the Release 8 randomization procedure is NCCE,k, the total number of CCEs in the control region for a subframe. In some embodiments, the same randomization procedure is used, but the value of NCCE,k is set to the total number of eCCEs within a distributed or localized section of one of the partitions of the entire control region. Hence, in the example of FIG. 19, the 48 eCCE control region is partitioned into three 16 eCCE partitions. The second and third partitions are further split into distributed and localized sections of 8 CCEs each. When search space randomization is performed within, for example, the distributed allocation part of partition 2, the value of NCCE,k is set to 8. A different randomization procedure may be used than the one used in Release 8.

There will be situations where RBGs are not fully used for ePDCCHs, in which case some resources inside the RBG could be wasted. In order to maximize resource utilization, it would be useful if a UE could use these resources. However, knowledge of which parts of the RBG are being used for the ePDCCH then becomes necessary. However, if a UE is to receive data in an RBG being used to send an ePDCCH to another UE, the UE receiving data will not have any information on the size and location of the other UE's ePDCCH. In some embodiments, then a UE receiving an ePDCCH inside an RBG utilizes the rest of the resources in the RBG for data when the ePDCCH signals the RBG carrying the ePDCCH as being allocated for data. That is, if a downlink PDSCH resource allocation assignment in the DCI message contains the RBG where the DCI message was received, then the UE assumes that the remaining RB(s) within the RBG contain the PDSCH.

The inventive techniques described above provide a common search space design for both distributed and localized ePDCCH transmission that efficiently utilizes its resources with low impact on PDSCH scheduling flexibility. These techniques provide a way to map localized and distributed search spaces to physical resources while limiting the channel estimation complexity of the distributed search space and maximizing the scheduling gain of the localized search space. The search space design also solves the problem with certain aggregation levels of localized transmission being split over multiple PRBs when mixing localized and distributed in the same PRB pair.

With the specific examples described above in mind, it should be appreciated that FIG. 20 is a process flow diagram illustrating a generalized method for receiving control information in a UE served in a cell controlled by a radio network node and where the control region consists of multiple eREGs, aggregated into eCCEs which further are aggregated into the control channel which contains the control channel message (e.g., a Downlink Control Information, DCI, message). As shown at block 2010, the example method begins with the receiving of a downlink signal comprising an enhanced control region. As shown at block 2020, the UE forms distributed eCCEs from a first set of PRB pairs in the enhanced control region by aggregating eREGs from multiple PRB pairs to form an eCCE when the eREGs belong to the first set of PRB pairs. As shown at block 2030, the UE forms localized eCCEs from a second set of PRB pairs by aggregating eREGs from the same PRB pair to form an eCCE when the eREGs belong to the second set of eREGs.

As shown in the optional operation illustrated at block 2040, in some (but not all) embodiments, both distributed and localized eCCEs are formed from eREGs in a third set of PRB pairs—this may be the case where an enhanced control region is divided into distributed and localized parts in the middle of a set of PRB pairs, rather than at the end. More specifically, one or more additional distributed eCCEs are formed from the third set of PRB pairs by aggregating physical layer building blocks from multiple PRB pairs to form each additional distributed eCCE, and one or more additional localized eCCEs are formed from the third set of PRB pairs by aggregating physical layer building blocks such that each additional localized eCCE is formed from physical layer building blocks from within a single PRB pair of the third set.

As shown at block 2050, the eCCEs are aggregated to form control channel message candidates. In some cases, two, four, or eight eCCEs are aggregated to form a candidate message. These control channel message candidates are then decoded, as shown at block 2060, to determine whether they are actual control channel messages for the UE.

As shown by the detailed examples described earlier, the techniques illustrated in FIG. 20 may be carried out in an LTE network, where said physical layer building blocks are eREGS that consist of eight or nine resource elements. However, the techniques may be adapted to other radio communications networks as well.

Figure 20:
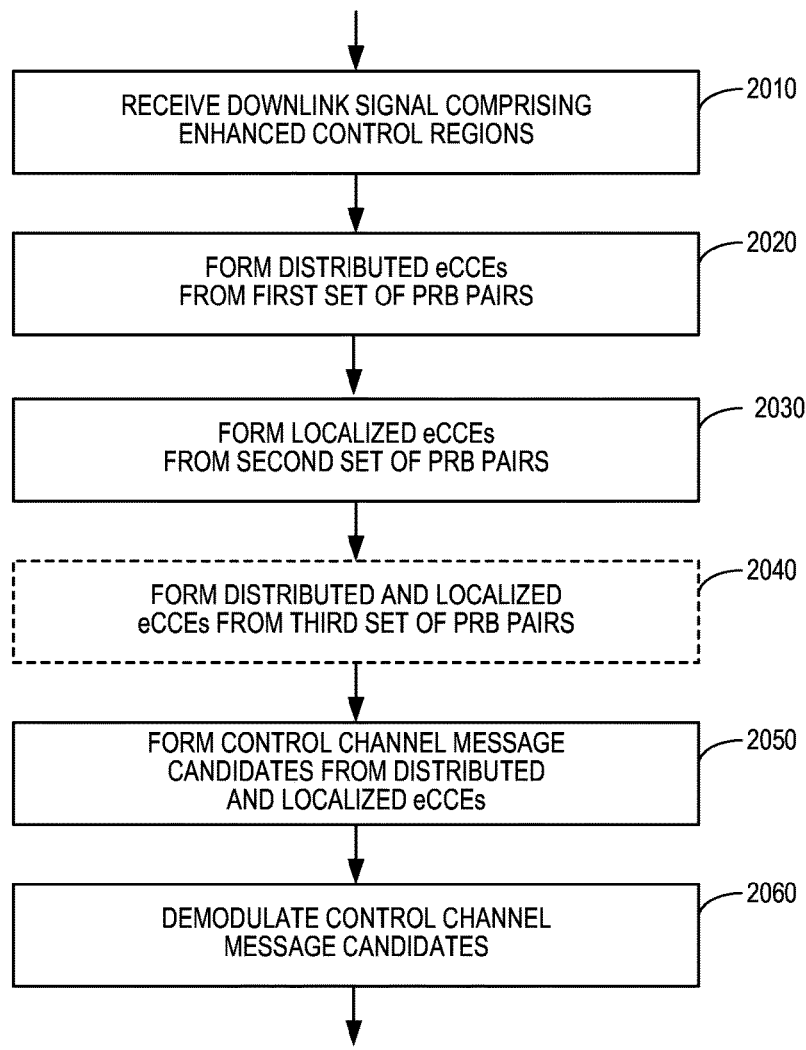
FIG. 20 is a process flow diagram illustrating an example method in a UE, according to some embodiments.

In some embodiments, the operations illustrated in FIG. 20 are preceded by the receiving at the UE of signalling (e.g., RRC signalling) from the controlling node, the signalling indicating a division of the PRB pairs into the first and second sets of PRB pairs. In some cases, the signalling may indicate a division point in a set of PRB pairs, the division point splitting the set into a first portion used to form the additional localized eCCEs and a second portion used to form the additional distributed eCCEs.

In some embodiments, forming the control channel message candidates from the distributed eCCEs and the localized eCCEs comprises determining a starting eCCE position within the enhanced control region, such that the starting eCCE position varies according to a subframe number for the downlink signal and a Radio Network Temporary Identifier, RNTI, for the user equipment. A number of control channel message candidates are formed from eCCEs beginning at the starting eCCE position. Note that in some cases, determining a starting eCCE position and forming a number of control channel message candidates is performed independently for the localized eCCEs and the distributed eCCEs. Also note that in some cases the numbering of eREGs and eCCEs may be reversed for the second set compared to the first set.

Figure 21:
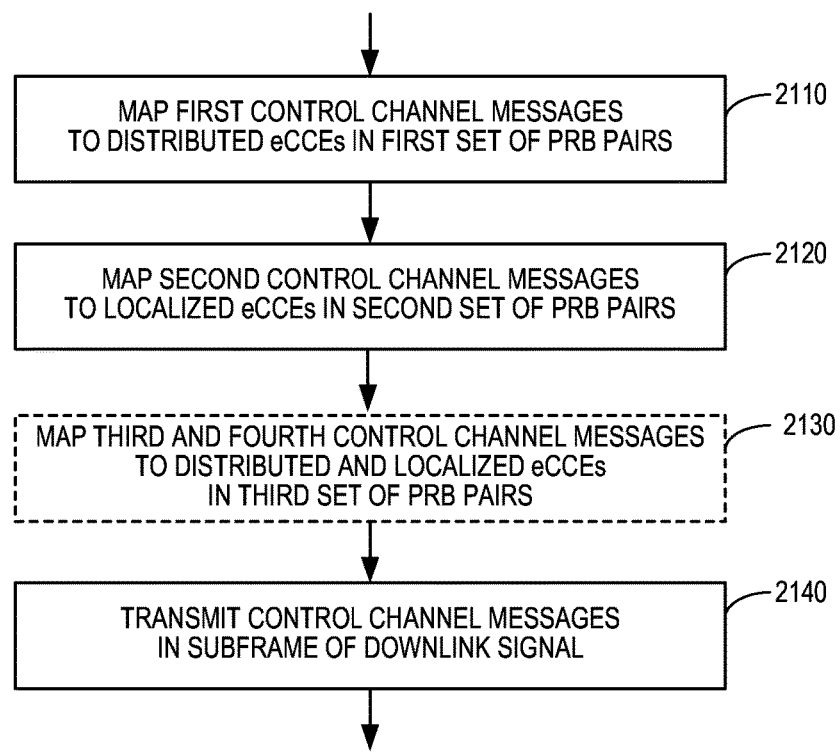
FIG. 21 is a process flow diagram illustrating an example method in a base station, according to some embodiments of the present invention.

It will be appreciated that corresponding methods, for forming and transmitting control channel messages in a base station, follow directly from the above. FIG. 21 illustrates an example of one such method, and begins with the mapping of first control channel messages to distributed eCCEs in a first set of physical resource block pairs, as shown at block 2110. Each distributed eCCE consists of an aggregation of physical layer building blocks from multiple PRB pairs. As shown at block 2120, the base station maps second control channel messages to localized eCCEs in a second set of physical resource block pairs. Each localized eCCE consists of an aggregation of physical layer building blocks from within a single PRB pair. As shown in an optional operation at block 2130, in some embodiments third and fourth control channel messages may be mapped to distributed and localized eCCEs, respectively, in a third set of PRB pairs. The sets of PRB pairs together form an enhanced control region. This enhanced control region, carrying the control channel messages described above, is then transmitted in a subframe of a downlink signal, as shown at block 2140.

In some embodiments of the illustrated method, mapping at least some of the first and second control channel messages to the distributed eCCEs and the localized eCCEs comprises mapping a control channel message to an aggregation of two or more localized eCCEs or two or more distributed eCCEs. The method may be preceded, in some cases, by the transmission of RRC signalling that indicates a division of the PRB pairs into the first and second sets of PRB pairs. In some cases, the signalling may indicate a division point that splits a third set of PRB pairs into a first portion used for control channel messages mapped to localized eCCEs and a second portion used for control channel messages mapped to distributed eCCEs.

It will be further appreciated that corresponding apparatus embodiments adapted (e.g., using programmed or hardware-configured processing circuits) to carry out these methods, i.e., user equipment/mobile station apparatus and base station (e.g., eNodeB) apparatus, also follow directly from the above. More particularly, it will be appreciated that the functions in the techniques and methods described above may be implemented using electronic data processing circuitry provided in the mobile station and in a base station. Each mobile station and base station, of course, also includes suitable radio circuitry for receiving and transmitting radio signals formatted in accordance with known formats and protocols, e.g., LTE formats and protocols.

Figure 22:
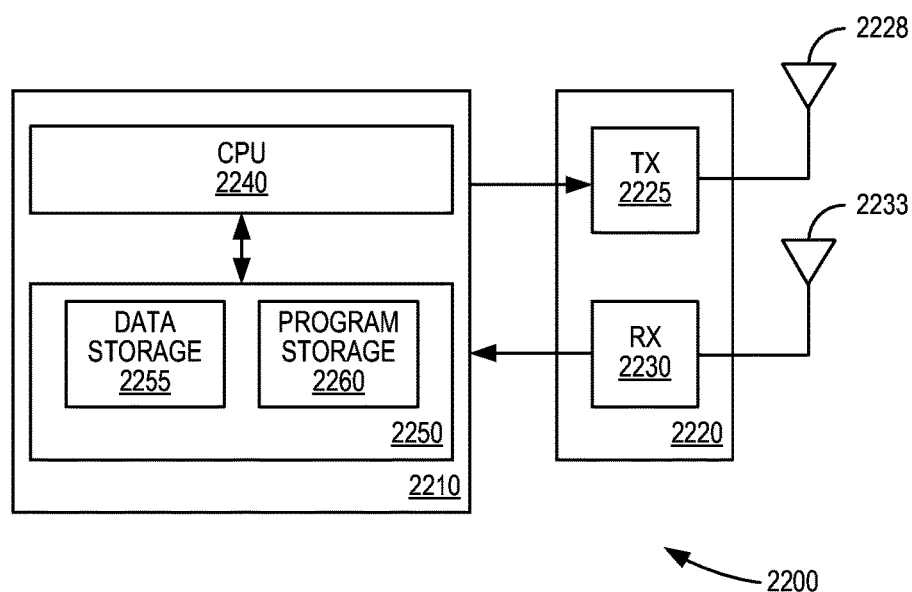
FIG. 22 is a block diagram illustrating components of an example radio node according to some embodiments.

FIG. 22 illustrates features of an example communications node 2200 according to several embodiments of the presently disclosed techniques. Although the detailed configuration, as well as features such as physical size, power requirements, etc., will vary, the general characteristics of the elements of communications node 2200 are common to both a wireless base station and a mobile station. Further, both may be adapted to carry out one or several of the techniques described above for aggregating time-frequency resources to form control channel elements, in both localized and distributed fashions.

Communications node 2200 comprises a transceiver 2220 for communicating with mobile terminals (in the case of a base station) or with one or more base stations (in the case of a mobile terminal) as well as a processing circuit 2210 for processing the signals transmitted and received by the transceiver 2220. Transceiver 2220 includes a transmitter 2225 coupled to one or more transmit antennas 2228 and receiver 2230 coupled to one or more receive antennas 2233. The same antenna(s) 2228 and 2233 may be used for both transmission and reception. Receiver 2230 and transmitter 2225 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the presently disclosed techniques and apparatus, additional details are not shown here.

Processing circuit 2210 comprises one or more processors 2240, hardware, firmware or a combination thereof, coupled to one or more memory devices 2250 that make up a data storage memory 2255 and a program storage memory 2260. Memory 2250 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the presently disclosed techniques and apparatus, additional details are not shown here. Typical functions of the processing circuit 2210 include modulation and coding of transmitted signals and the demodulation and decoding of received signals. In several embodiments, processing circuit 2210 is adapted, using suitable program code stored in program storage memory 2260, for example, to carry out one of the techniques described above for receiving control information in a user equipment or for sending control information from a base station. Of course, it will be appreciated that not all of the steps of these techniques are necessarily performed in a single microprocessor or even in a single module. Thus, embodiments of the presently disclosed techniques include computer program products for application in a user equipment as well as corresponding computer program products for application in a base station apparatus.

An example computer program product comprises a non-transitory computer-readable medium, such as program storage memory 2260, the computer-readable medium in turn comprising computer program instructions configured for execution by a processor in a UE. The computer program instructions include, for example: program instructions for causing the UE to receive a downlink signal comprising an enhanced control region consisting of at least two sets of physical resource block, PRB, pairs, each PRB pair consisting of a group of non-overlapping physical layer building blocks; program instructions for causing the UE to form one or more distributed enhanced control-channel elements, eCCEs, from a first set of PRB pairs by aggregating physical layer building blocks from multiple PRB pairs to form each distributed eCCE; program instructions for causing the UE to form one or more localized eCCEs from a second set of PRB pairs by aggregating physical layer building blocks such that each of the localized eCCEs is formed from physical layer building blocks from within a single PRB pair of the second set; program instructions for causing the UE to form first control channel message candidates from the distributed eCCEs and second control channel message candidates from the localized eCCEs; and program instructions for causing the UE to decode each of the first and second control channel message candidates to search for a valid control channel message.

Similarly, another example computer program product, for use in a base station, again comprises a non-transitory computer-readable medium, such as program storage memory 2260. In this case, however, the computer-readable medium comprises computer program instructions configured for execution by a processor in a base station apparatus. The program instructions in turn comprise: program instructions for causing the base station to transmit a downlink signal comprising an enhanced control region consisting of at least two sets of physical resource block, PRB, pairs, each PRB pair consisting of a group of non-overlapping physical layer building blocks; program instructions for causing the base station to map one or more first control channel messages to distributed enhanced control-channel elements, eCCEs, in a first set of PRB pairs, where each distributed eCCE consists of an aggregation of physical layer building blocks from multiple PRB pairs; program instructions for causing the base station to map one or more second control channel messages to localized eCCEs in a second set of PRB pairs, where each localized eCCE consists of an aggregation of physical layer building blocks from within a single PRB pair; and program instructions for causing the base station to transmit the first control channel messages and the second control channel messages in a subframe of the downlink signal.

It will be appreciated by the person of skill in the art that various modifications may be made to the above described embodiments without departing from the scope of the presently disclosed techniques and apparatus. For example, it will be readily appreciated that although the above embodiments are described with reference to parts of a 3GPP network, embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the present techniques and apparatus can be implemented in other ways than those specifically set forth herein, without departing from their essential characteristics. The present embodiments are thus to be considered in all respects as illustrative and not restrictive.

With these and other variations and extensions in mind, those skilled in the art will appreciate that the foregoing description and the accompanying drawings represent non-limiting examples of the systems and apparatus taught herein for forming, transmitting, receiving, demodulating, and decoding enhanced control channel information. As such, the disclosed systems and apparatus are not limited by the foregoing description and accompanying drawings.

What is claimed is:

1. A method, in a user equipment, for receiving control information in a radio communications network, the method comprising:
   receiving a downlink signal comprising an enhanced control region consisting of at least a first set of physical resource block (PRB) pairs and a second set of PRB pairs, each PRB pair consisting of a group of non-overlapping physical layer building blocks; and
   performing a search for a first control channel message by:
   (a) forming one or more distributed enhanced control-channel elements (eCCE) from the first set of PRB pairs by aggregating physical layer building blocks from multiple PRB pairs to form each distributed eCCE;
   (b) forming one or more localized eCCEs from the second set of PRB pairs by aggregating physical layer building blocks such that each of the localized eCCEs is formed from physical layer building blocks from within a single PRB pair of the second set;
   (c) forming first control channel message candidates from the distributed eCCEs and forming second control channel message candidates from the localized eCCEs; and
   (d) decoding each of both the first and second control channel message candidates to search for the first control channel message;
   wherein said physical layer building blocks are enhanced Resource Element Groups (eREGs), each eREG consisting of eight or nine resource elements, and wherein forming the first control channel message candidates from the distributed eCCEs and the second control channel message candidates from the localized eCCEs comprises determining a starting eCCE position within the enhanced control region, such that the starting eCCE position varies according to a subframe number for the downlink signal and a Radio Network Temporary Identifier (RNTI) for the user equipment, and forming a number of control channel message candidates from eCCEs beginning at the starting eCCE position.

2. The method of claim 1, wherein said radio communications network is a Long-Term Evolution (LTE) radio network.

3. The method of claim 1, wherein forming the first and second control channel message candidates comprises forming at least some of the control channel message candidates by aggregating two or more of the localized eCCEs or two or more of the distributed eCCEs, or both.

4. The method of claim 1, further comprising receiving Radio Resource Control (RRC) signalling that indicates a division of the PRB pairs into the first and second sets of PRB pairs.

5. The method of claim 1, wherein performing the search for the first control message further comprises:
   forming one or more additional distributed eCCEs from a third set of PRB pairs by aggregating physical layer building blocks from multiple PRB pairs to form each additional distributed eCCE;
   forming one or more additional localized eCCEs from the third set of PRB pairs by aggregating physical layer building blocks such that each additional localized eCCE is formed from physical layer building blocks from within a single PRB pair of the third set;

forming one or more third control channel message candidates from the additional distributed eCCEs and one or more fourth control channel message candidates from the additional localized eCCEs; and decoding each of both the third and fourth control channel message candidates, in addition to the first and second control channel message candidates, to search for the first control channel message.

6. The method of claim 5, further comprising receiving Radio Resource Control (RRC) signalling that indicates a division point in the third set of PRB pairs, the division point splitting the third set into a first portion used to form the additional localized eCCEs and a second portion used to form the additional distributed eCCEs.

7. The method of claim 1, wherein said determining a starting eCCE position and said forming a number of control channel message candidates is performed independently for each of the localized eCCEs and the distributed eCCEs.

8. The method of claim 7, wherein the starting eCCE position for the localized eCCEs and the starting point for the distributed eCCEs are at or near opposite ends of a range of numbered eCCEs, such that the second control channel messages are formed by traversing the numbered eCCEs in a reverse order from that used for forming the first control channel messages.

9. A user equipment apparatus, comprising a transceiver configured to receive a downlink signal comprising an enhanced control region consisting of at least a first set of physical resource block (PRB) pairs and a second set of PRB pairs, each PRB pair consisting of a group of non-overlapping physical layer building blocks, and a processing circuit configured to perform a search for a first control channel message by:

forming one or more distributed enhanced control-channel elements (eCCE) from the first set of PRB pairs by aggregating physical layer building blocks from multiple PRB pairs to form each distributed eCCE;

forming one or more localized eCCEs from the second set of PRB pairs by aggregating physical layer building blocks such that each of the localized eCCEs is formed from physical layer building blocks from within a single PRB pair of the second set;

forming first control channel message candidates from the distributed eCCEs and second control channel message candidates from the localized eCCEs; and decoding each of both the first and second control channel message candidates to search for the first control channel message;

wherein said physical layer building blocks are enhanced Resource Element Groups (eREGs), each eREG consisting of eight or nine resource elements, and wherein the processing circuit is adapted to form the first control channel message candidates from the distributed eCCEs and the second control channel message candidates from the localized eCCEs by determining a starting eCCE position within the enhanced control region, such that the starting eCCE position varies according to a subframe number for the downlink signal and a Radio Network Temporary Identifier (RNTI) for the user equipment, and forming a number of control channel message candidates from eCCEs beginning at the starting eCCE position.

10. The user equipment apparatus of claim 9, wherein the processing circuit is further configured so that performing the search for the first control channel message comprises:

forming one or more additional distributed eCCEs from a third set of PRB pairs by aggregating physical layer building blocks from multiple PRB pairs to form each additional distributed eCCE;

forming one or more additional localized eCCEs from the third set of PRB pairs by aggregating physical layer building blocks such that each additional localized eCCE is formed from physical layer building blocks from within a single PRB pair of the third set;

forming one or more third control channel message candidates from the additional distributed eCCEs and one or more fourth control channel message candidates from the additional localized eCCEs; and decoding each of both the third and fourth control channel message candidates, in addition to the first and second control channel message candidates, to search for the first control channel message.

11. The user equipment apparatus of claim 9, wherein the processing circuit is further configured to receive, via the transceiver, Radio Resource Control (RRC) signalling that indicates a division point in the third set of PRB pairs, the division point splitting the third set into a first portion used to form the additional localized eCCEs and a second portion used to form the additional distributed eCCEs.

12. The method of claim 1, wherein the first set of PRB pairs is disjoint from the second set of PRB pairs.

13. The user equipment apparatus of claim 9, wherein the first set of PRB pairs is disjoint from the second set of PRB pairs.

14. A method, in a user equipment, for receiving control information in a radio communications network, the method comprising:

receiving a downlink signal comprising an enhanced control region consisting of at least a first set of physical resource block (PRB) pairs and a second set of PRB pairs, each PRB pair consisting of a group of non-overlapping physical layer building blocks;

receiving Radio Resource Control (RRC) signalling that indicates a division of the PRB pairs into the first and second sets of PRB pairs;

forming one or more distributed enhanced control-channel elements (eCCE) from the first set of PRB pairs by aggregating physical layer building blocks from multiple PRB pairs to form each distributed eCCE;

forming one or more localized eCCEs from the second set of PRB pairs by aggregating physical layer building blocks such that each of the localized eCCEs is formed from physical layer building blocks from within a single PRB pair of the second set;

forming first control channel message candidates from the distributed eCCEs and second control channel message candidates from the localized eCCEs; and decoding each of the first and second control channel message candidates to search for a valid control channel message;

wherein said physical layer building blocks are enhanced Resource Element Groups (eREGs), each eREG consisting of eight or nine resource elements, and wherein forming the first control channel message candidates from the distributed eCCEs and the second control channel message candidates from the localized eCCEs comprises determining a starting eCCE position within the enhanced control region, such that the starting eCCE position varies according to a subframe number for the downlink signal and a Radio Network Temporary Identifier (RNTI) for the user equipment, and forming a number of control channel message candidates from eCCEs beginning at the starting eCCE position.

15. A user equipment apparatus, comprising
a transceiver adapted for receiving a downlink signal comprising an enhanced control region consisting of at least a first set of physical resource block (PRB) pairs and a second set of PRB pairs, each PRB pair consisting of a group of non-overlapping physical layer building blocks, and
a processing circuit adapted to:
receive, via the transceiver, Radio Resource Control (RRC) signalling that indicates a division of the PRB pairs into the first and second sets of PRB pairs;
form one or more distributed enhanced control-channel elements (eCCE) from the first set of PRB pairs by aggregating physical layer building blocks from multiple PRB pairs to form each distributed eCCE;
form one or more localized eCCEs from the second set of PRB pairs by aggregating physical layer building blocks such that each of the localized eCCEs is formed from physical layer building blocks from within a single PRB pair of the second set;
form first control channel message candidates from the distributed eCCEs and second control channel message candidates from the localized eCCEs; and
decode each of the first and second control channel message candidates to search for a valid control channel message;
wherein said physical layer building blocks are enhanced Resource Element Groups (eREGs), each eREG consisting of eight or nine resource elements, and wherein the processing circuit is adapted to form the first control channel message candidates from the distributed eCCEs and the second control channel message candidates from the localized eCCEs by determining a starting eCCE position within the enhanced control region, such that the starting eCCE position varies according to a subframe number for the downlink signal and a Radio Network Temporary Identifier (RNTI) for the user equipment, and forming a number of control channel message candidates from eCCEs beginning at the starting eCCE position.

* * * * *